(12) United States Patent
Chen et al.

(10) Patent No.: US 11,233,297 B2
(45) Date of Patent: Jan. 25, 2022

(54) SECONDARY BATTERY INCLUDING PLURAL ELECTRODE UNITS WITH TABS SMALLER THAN END FACE OF ELECTRODE UNIT, AND BATTERY MODULE INCLUDING THE SAME

(71) Applicant: Contemporary Amperex Technology Co., Limited, Ningde (CN)

(72) Inventors: Ning Chen, Ningde (CN); Haizu Jin, Ningde (CN); Dongyang Shi, Ningde (CN); Zhenhua Li, Ningde (CN); Yuanbao Chen, Ningde (CN); Rui Yang, Ningde (CN); Fei Hu, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 154 days.

(21) Appl. No.: 16/455,751

(22) Filed: Jun. 28, 2019

(65) Prior Publication Data
US 2020/0235370 A1 Jul. 23, 2020

(30) Foreign Application Priority Data
Jan. 22, 2019 (CN) .......................... 201910058990.7

(51) Int. Cl.
*H01M 50/54* (2021.01)
*H01M 10/0585* (2010.01)
(Continued)

(52) U.S. Cl.
CPC ....... *H01M 50/54* (2021.01); *H01M 10/0585* (2013.01); *H01M 50/15* (2021.01); *H01M 50/20* (2021.01)

(58) Field of Classification Search
CPC ...... H01M 50/54; H01M 50/20; H01M 50/15; H01M 10/0585
(Continued)

(56) References Cited

U.S. PATENT DOCUMENTS

| | | | |
|---|---|---|---|
| 2008/0206628 A1* | 8/2008 | Honbou | H01M 10/613 429/94 |
| 2012/0009450 A1* | 1/2012 | Chun | H01M 50/56 429/94 |

(Continued)

FOREIGN PATENT DOCUMENTS

| | | |
|---|---|---|
| CN | 103887556 A | 6/2014 |
| CN | 206250347 U | 6/2017 |

(Continued)

OTHER PUBLICATIONS

The extended European search report dated Jan. 2, 2020 for European application No. 19184413.3, 7 pages.
(Continued)

*Primary Examiner* — Sean P Cullen
(74) *Attorney, Agent, or Firm* — Law Offices of Liaoteng Wang

(57) ABSTRACT

The disclosure relates to a secondary battery and a battery module. The secondary battery comprises a casing, which includes a receiving hole having an opening; a top cover assembly, which includes a top cover plate connected to the casing to close the opening; an electrode assembly disposed within the receiving hole, the electrode assembly has an dimension of 0.01 mm to 1000 mm in an axial direction of the receiving hole, the electrode assembly includes two end faces opposed to each other in a first direction perpendicular to the axial direction and tabs extending from the end faces, the electrode assembly includes two or more electrode units laminated in the axial direction, and in a second direction perpendicular to the axial direction and the first direction, (Continued)

the dimension of the tab is smaller than the dimension of the end face; and a current collecting member electrically connected to the tab.

17 Claims, 13 Drawing Sheets

(51) Int. Cl.
*H01M 50/15* (2021.01)
*H01M 50/20* (2021.01)

(58) Field of Classification Search
USPC .................................. 429/156, 159, 160
See application file for complete search history.

(56) References Cited

U.S. PATENT DOCUMENTS

2012/0196166 A1* 8/2012 Kim .................... H01M 50/528
429/94
2014/0349149 A1* 11/2014 Kim ...................... H01M 50/50
429/61
2017/0062792 A1 3/2017 Baik et al.
2019/0221813 A1* 7/2019 Yang .................. H01M 50/538

FOREIGN PATENT DOCUMENTS

| | | |
|---|---|---|
| CN | 107214446 A | 9/2017 |
| CN | 108428822 A | 8/2018 |
| CN | 209217104 U | 8/2019 |
| CN | 209571433 U | 11/2019 |
| JP | 2007073317 A | 3/2007 |
| KR | 20150058807 A | 5/2015 |

OTHER PUBLICATIONS

PCT International Search Report for PCT/CN2020/072239, dated Apr. 20, 2020, 10 pages.

* cited by examiner

SECONDARY BATTERY INCLUDING PLURAL ELECTRODE UNITS WITH TABS SMALLER THAN END FACE OF ELECTRODE UNIT, AND BATTERY MODULE INCLUDING THE SAME

CROSS-REFERENCE TO RELATED APPLICATION

This application is based on and claims priority to Chinese Patent Application No. 201910058990.7 filed on Jan. 22, 2019, which is incorporated herein by reference in its entirety.

TECHNICAL FIELD

The disclosure relates to the technical field of battery, and in particular, to a secondary battery and a battery module.

BACKGROUND

With the development of science and technology, secondary batteries are widely used in portable electronic devices such as mobile phones, digital video cameras and laptop computers, and have broad application prospects in electric vehicles such as electric automobiles and electric bicycles and large or medium-sized electric devices such as energy storage facilities. Therefore, secondary batteries become important technical means to solve global problems such as energy crisis and environmental pollution. In the prior art, the electrode assembly included in the secondary battery has an end face and a full tab extending from the end face. Since the dimension of the full tab is equal to the dimension of the end face and the electrolyte mainly infiltrates through the gap in the end face, it is difficult for the electrolyte to infiltrate the entire electrode assembly quickly and uniformly in the electrolyte infiltration step, which causes poor infiltration effect and low infiltration efficiency.

SUMMARY

Embodiments of the disclosure provide a secondary battery and a battery module. The secondary battery includes an electrode assembly having an end face and a tab having a dimension smaller than that of the end face, and the electrolyte can be immersed into the interior of the electrode assembly more quickly and uniformly through the end face, thereby making the electrode assembly have high infiltration efficiency and good infiltration effect.

In one aspect, an embodiment of the disclosure provide a secondary battery comprising a casing, which includes a receiving hole having an opening; a top cover assembly, which includes a top cover plate connected to the casing to close the opening; an electrode assembly, which is disposed within the receiving hole, the electrode assembly has an dimension of 0.01 mm to 1000 mm in an axial direction of the receiving hole, the electrode assembly includes two end faces which are opposed to each other in a first direction perpendicular to the axial direction and tabs extending from the end faces, the electrode assembly includes two or more electrode units which are laminated in the axial direction, and in a second direction perpendicular to the axial direction and the first direction, the dimension of the tab is smaller than the dimension of the end face; and a current collecting member, which is electrically connected to the tab.

According to an aspect of the embodiment of the disclosure, the end face includes a first region, a second region, and a third region that are distributed along the second direction, the tab only extends out of the first region, and the second region and the third region are respectively located on both sides of the first region.

According to an aspect of the embodiment of the disclosure, in the second direction, a dimension of the third region is smaller than a dimension of the second region.

According to an aspect of the embodiment of the disclosure, in the second direction, a ratio of a dimension of the tab to a dimension of the end face is $1/15$ to $14/15$.

According to an aspect of the embodiment of the disclosure, the electrode assembly includes two electrode units, each of the two electrode units has two sub-end faces and a sub-tab extending from each of the two sub-end faces, two of the sub-end faces on the same side of the two electrode units of the electrode assembly form the end face, and two of the sub-tabs of the two electrode units of the electrode assembly having same electrode are converged to form the tab, and in the electrode assembly, the sub-tab of one of the two electrode units extends along the axial direction from the region of the sub-end face adjacent to the other of the two electrode units.

According to an aspect of the embodiment of the disclosure, the electrode unit has two wide faces and two narrow faces connecting the two wide faces, the two wide faces are opposite in the axial direction, the wide faces and the narrow faces are alternately disposed, and the tab extends from the region of the end face adjacent to the two adjacent wide faces of the two electrode units.

According to an aspect of the embodiment of the disclosure, the current collecting member includes a connecting portion disposed between the end face and the casing, and the connecting portion and the tab are at least partially overlapped in the axial direction.

According to an aspect of the embodiment of the disclosure, the current collecting member further includes a body portion that is connected to the connecting portion, and the body portion is at least partially disposed between the electrode assembly and the top cover assembly.

According to an aspect of the embodiment of the disclosure, the connecting portion has a first sheet extending along the axial direction, the first sheet has a stripe structure and the thickness direction of the first sheet is parallel to the first direction, and the tab is electrically connected to the first sheet.

According to an aspect of the embodiment of the disclosure, the connecting portion further has a current collecting piece, through which the tab is electrically connected to the first sheet, a connection structure is formed by the first sheet and the tab, and the connection structure does not protrude out of an edge of the top cover plate in the first direction.

According to an aspect of an embodiment of the disclosure, the tab and the current collecting piece are both located on one side of the first sheet in the second direction, and the current collecting piece and the tab are at least partially overlapped in the axial direction.

According to an aspect of the embodiment of the disclosure, the number of the electrode assemblies is two groups, and the two groups of the electrode assemblies are laminated in the axial direction; the number of the current collecting pieces is two, and the two current collecting pieces are spaced apart in the axial direction and the two current collecting pieces are at least partially overlapped in the axial direction; the tab of one group of the electrode assemblies and the tab of the other group of the electrode assemblies are respectively connected to the two current collecting pieces, and the tab of the one group of the electrode assemblies and the tab of the other group of the electrode assemblies at least partially overlap in the axial direction.

According to an aspect of the embodiment of the disclosure, the first sheet and the tab are at least partially overlapped in the axial direction.

According to an aspect of the embodiment of the disclosure, the number of the electrode assemblies is two groups, and the two groups of the electrode assemblies are laminated in the axial direction; the number of the first sheets and the number of the current collecting pieces each is two, the first sheets are disposed in one-to-one correspondence with the current collecting pieces, the two first sheets are spaced apart in the second direction, and the two current collecting pieces are spaced apart in the axial direction and are spaced apart in the second direction; the tab of one group of the electrode assemblies and the tab of the other group of the electrode assemblies are spaced apart in the axial direction and are spaced apart in the second direction, and the two tabs are respectively connected to the two current collecting pieces.

According to an aspect of the embodiment of the disclosure, the connecting portion has a first sheet extending along the axial direction and a second sheet connected to the first sheet, the first sheet has a stripe structure and the thickness direction of the first sheet is parallel to the second direction, the second sheet is connected to the first sheet and extends toward outside of the first sheet along the second direction, and the tab and the second sheet are at least partially overlapped in the axial direction.

According to an aspect of the embodiment of the disclosure, the number of the current collecting members is two, and in the first direction, the electrode assembly is disposed between the two current collecting members, and the two current collecting members are electrically connected to the corresponding tabs.

The secondary battery according to the embodiment of the disclosure includes a casing, an electrode assembly disposed within the casing, a top cover assembly connected to the casing, and a current collecting member electrically connected to the electrode assembly. The electrode assembly has end faces and tabs extending from the end faces. The tab of the electrode assembly is electrically connected to the current collecting member. Since the dimension of the tab according to the present embodiment is smaller than the dimension of the end face, the tab cannot completely cover the end face, so that the electrolyte can be immersed into the interior of the electrode assembly more quickly and uniformly through the region of the end face that is not covered by the tab. Thus, it is advantageous to improve the infiltration efficiency and the infiltration effect of the electrode assembly in the electrolyte infiltration step.

In another aspect of the disclosure, there is provided a battery module including two or more secondary batteries mentioned in the above embodiments, wherein the two or more secondary batteries are arranged side by side in a direction intersecting with the axial direction.

BRIEF DESCRIPTION OF THE DRAWINGS

Features, advantages, and technical effects of the exemplary embodiments of the disclosure will be described below with reference to the drawings.

Figure 1:
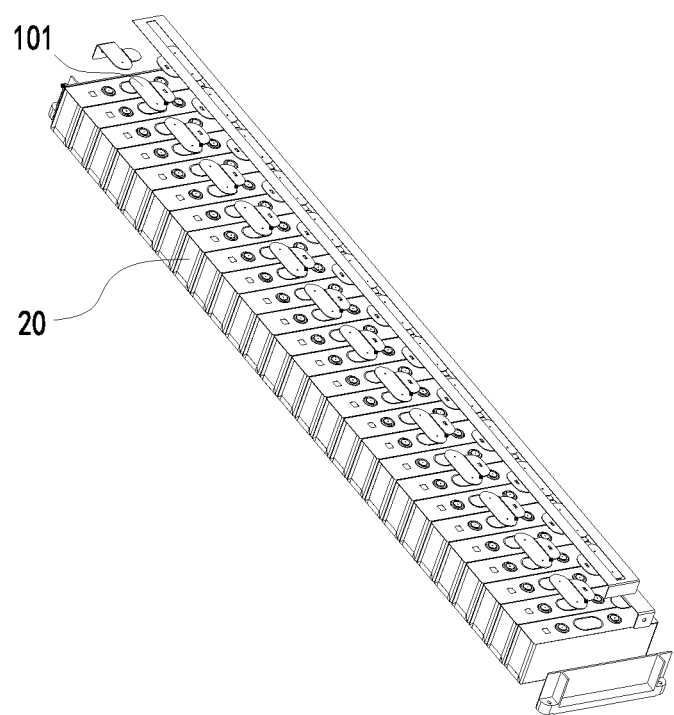
FIG. 1 is a schematic view showing the structure of a battery module according to an embodiment of the disclosure.

In the drawings, the drawings are not drawn to scale.

NUMERAL REFERENCES

10—battery module; 101—busbar;
20—secondary battery;
21—casing; 21a—receiving hole;
22—top cover assembly; 221—top cover plate; 221a—edge; 222—electrode terminal;
23—electrode assembly; 23a—end face; 23b—tab; 230a—first region; 230b—second region; 230c—third region; 231—electrode unit; 231a—sub-end surface; 231b—sub-tab; 231c—wide face; 231d—narrow face;
24—current collecting member; 241—connecting portion; 241a—first sheet; 241b—current collecting piece; 241c—second sheet; 242—body portion;
99—welding portion;
X—axial direction; Y—first direction; Z—second direction.

DETAILED DESCRIPTION

Embodiments of the present disclosure will be further described in detail below in conjunction with the accompanying drawings and embodiments. The detailed description of the embodiments and the accompanying drawings are intended to illustrate the principle of the disclosure but are not intended to limit the scope of the disclosure, i.e., the present disclosure is not limited to the described embodiments.

In the description of the present disclosure, it should be appreciated that, unless otherwise stated, the meaning of "plurality" is two or more; the orientation or positional relationship indicated by the terms "upper", "lower" "left", "right", "inside", "outside" and like is merely for convenience of description of the present disclosure and simplification of the description, and is not meant to indicate or intend that the involved device or element must have specific orientation or must be configured and operated in a specific orientation, and therefore, should not to be construed as a limitation to the disclosure. Moreover, the terms "first", "second", and the like are only used for the purpose of description, and should not to be construed as indicating or implying relative importance.

In the description of the present disclosure, it should be also appreciated that, unless otherwise stated, the terms "mount", "connect with", and "connect to" are to be understood broadly, for example, it may be fixed connection or detachable connection or integral connection; or, it may be direct connection or indirect connection through an intermediate medium. The specific meaning of the above terms in the present disclosure may be understood by the skilled in the art based on the specific situation. The terms "perpendicular" and "parallel" involved in the various embodiments of the disclosure are not limited to strict definitions to perpendicular and parallel mathematically.

In order for better understanding of the disclosure, the battery module 10 and the secondary battery 20 according to the present embodiment of the disclosure will be described in detail below with reference to FIGS. 1 to 15.

Referring to FIG. 1, an embodiment of the disclosure provides a battery module 10, which includes two or more secondary batteries 20 according to the present embodiment and a busbar 101 for connecting two secondary batteries 20. The two or more secondary batteries 20 are arranged side by side in the same direction. One end of the busbar 101 is fixedly connected to one of the two secondary batteries 20, and the other end thereof is connected fixedly to the other of the secondary batteries 20.

Figure 2:
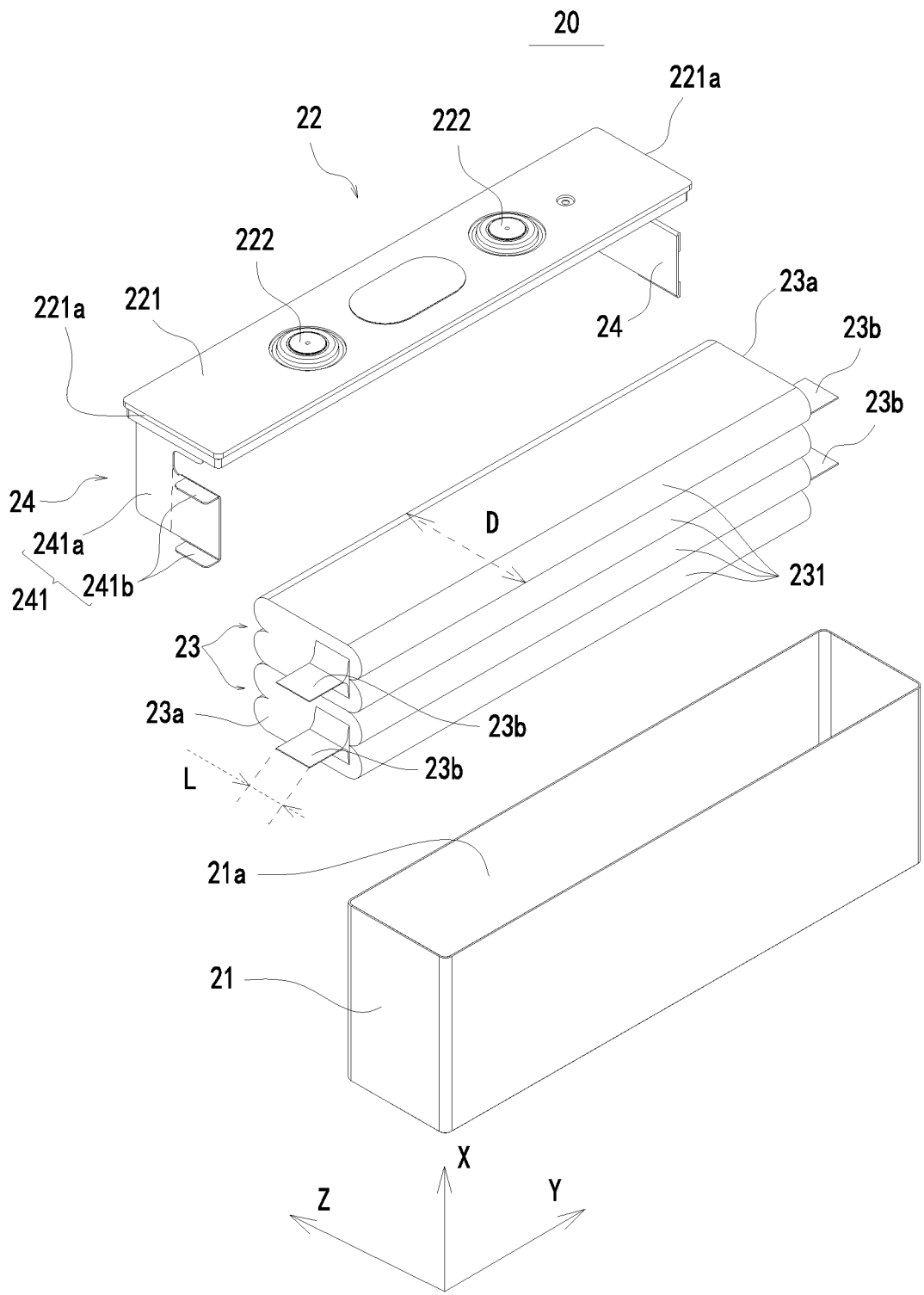
FIG. 2 is a schematic exploded perspective view showing the structure of a secondary battery according to an embodiment of the disclosure.
Figure 3:
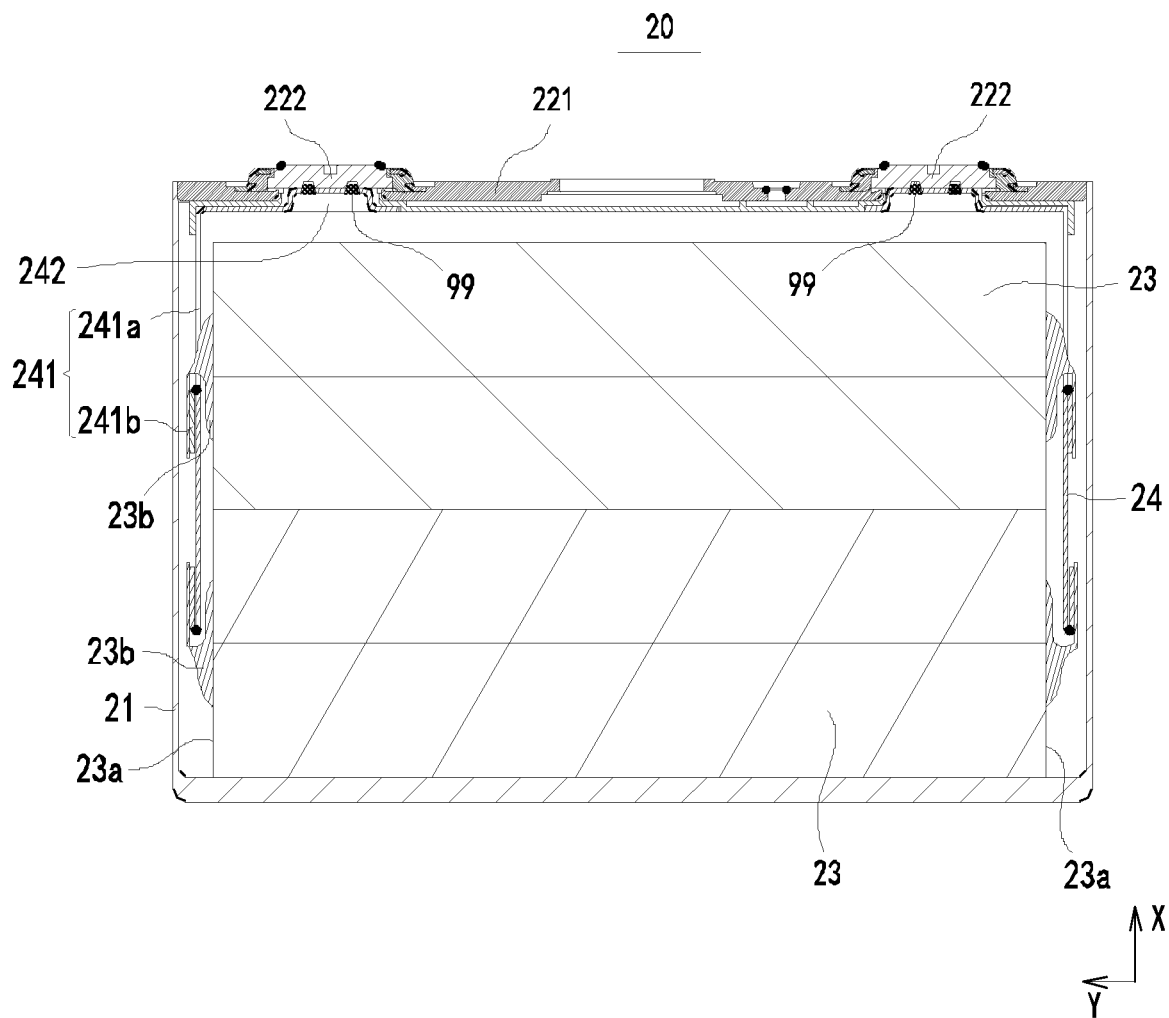
FIG. 3 is a cross-sectional view showing the structure of a secondary battery according to an embodiment of the disclosure.

Referring to FIGS. 2 and 3, the secondary battery 20 according to the present embodiment of the disclosure includes a casing 21, an electrode assembly 23 disposed within the casing 21, and a top cover assembly 22 sealingly connected to the casing 21.

The casing 21 according to the present embodiment may have a quadrangular shape or other shape. The casing 21 includes a receiving hole 21a having an opening. The receiving hole 21a is used for receiving the electrode assembly 23 and the electrolyte. The casing 21 may be made of a material such as aluminum, aluminum alloy, or plastic.

The electrode assembly 23 according to the present embodiment of the disclosure includes two end faces 23a which are opposed to each other in a first direction Y perpendicular to an axial direction X of the receiving hole 21a and tabs 23b extending from the end faces 23a, wherein the axial direction X of the receiving hole 21a is the same as the direction along which the receiving hole 21a extends. In the present embodiment, one tab 23b extends from each end face 23a of the electrode assembly 23. The electrode assembly 23 has two tabs 23b which are opposed to each other in the first direction Y, one of which serves as the positive tab and the other of which serves as the negative tab. The electrode assembly 23 according to the present embodiment has a dimension of 0.01 mm to 1000 mm in the axial direction X. Therefore, it is possible to ensure that the fitting dimension of the electrode assembly 23 according to the present embodiment can be flexibly selected according to the use requirements of the product.

Figure 4:
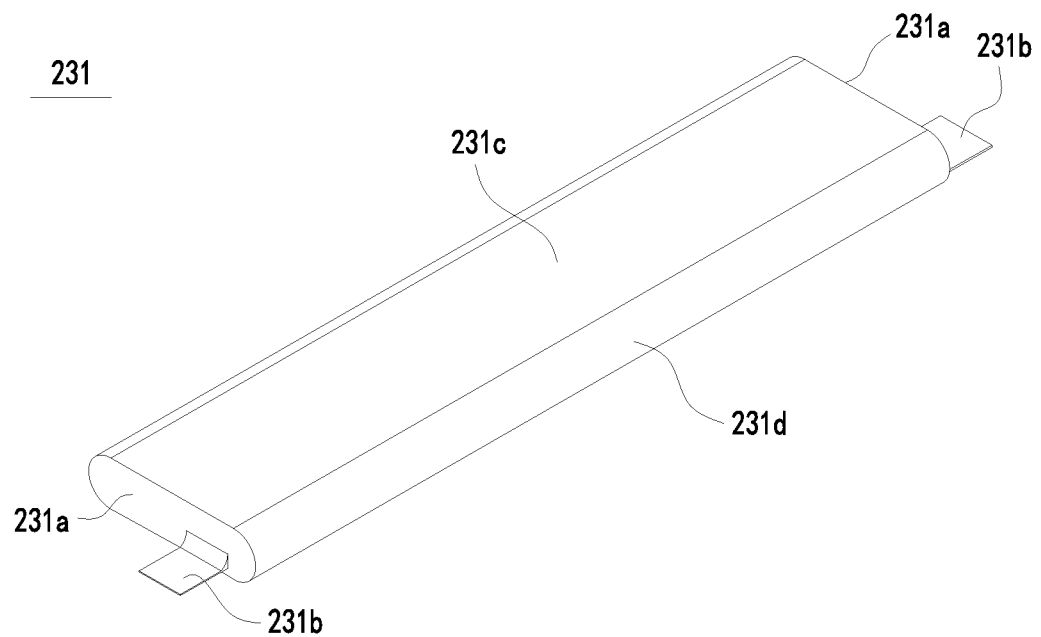
FIG. 4 is a schematic view showing the structure of an electrode unit according to an embodiment of the disclosure.
Figure 5:
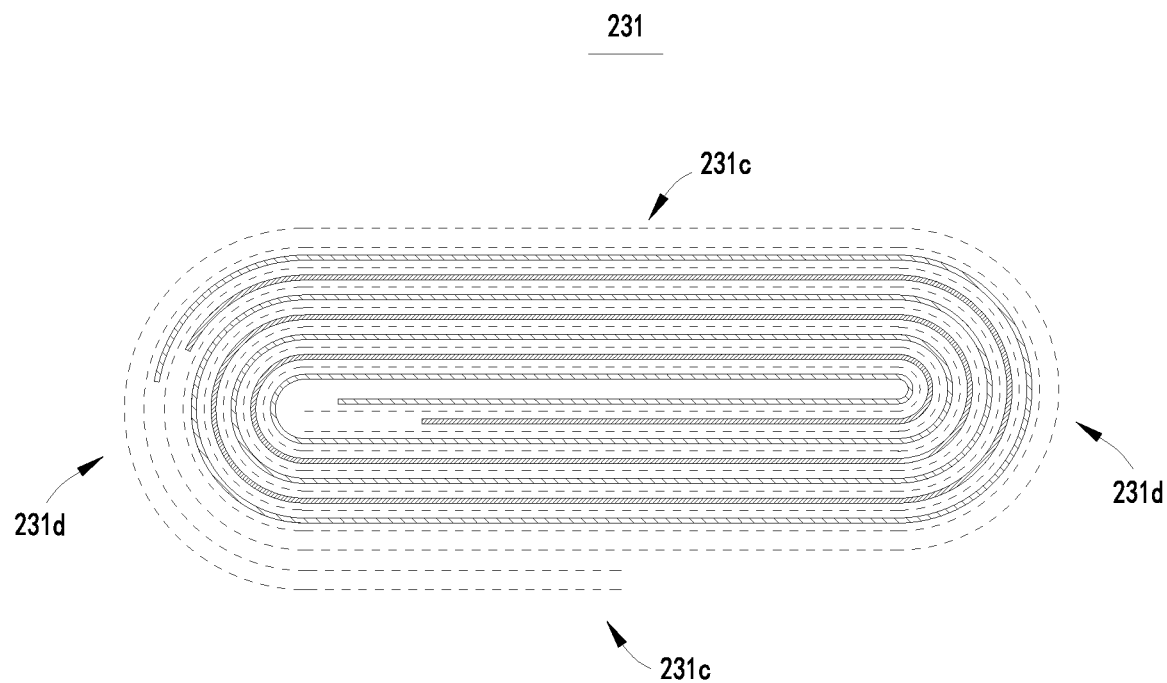
FIG. 5 is a cross-sectional view showing the structure of an electrode unit according to an embodiment of the disclosure.

Referring to FIGS. 4 and 5, the electrode assembly 23 according to the present embodiment includes two or more electrode units 231 which are laminated in the axial direction X of the receiving hole 21a. The electrode unit 231 has sub-end faces 231a and sub-tabs 231b extending from the sub-end faces 231a. The body and the sub-tabs 231b connected to the body of the electrode unit 231 according to the present embodiment may be formed by stacking or winding a first electrode plate, a second electrode plate, and a separator together. The separator is an insulator between the first electrode plate and the second electrode plate. The electrode unit 231 according to the present embodiment includes a layer of the separator, a layer of the first electrode plate, and a layer of the second electrode plate which are wound together. In the present embodiment, the first electrode plate is exemplified as a positive electrode plate, and the second electrode plate is a negative electrode plate. Similarly, in other embodiments, the first electrode plate may also be a negative electrode plate, and the second electrode plate is a positive electrode plate. Further, the positive-electrode active material is coated onto the coating region of the positive electrode plate, and the negative-electrode active material is coated onto the coating region of the negative electrode plate. A plurality of uncoated regions extending from the body serve as the sub-tabs 231b. Each electrode unit 231 includes two sub-tabs 231b, i.e., a positive tab and a negative tab, which are opposite to each other in the first direction Y. The first direction Y is perpendicular to the axial direction X. The end face 23a of one electrode assembly 23 includes the sub-end faces 231a of the respective electrode units 231, that is, the sub-end faces 231a on the same side of all the respective electrode units 231 collectively form the end face 23a. The tab 23b of one electrode assembly 23 includes the sub-tabs 231b of the respective electrode units 231, that is, the sub-tabs 231b having same electrode of all the respective electrode units 231 collectively converge to form the tab 23b. In one embodiment, as shown in FIG. 4, the electrode unit 231 has a flat structure having two wide faces 231c and two narrow faces 231d connecting the two wide faces 231c. The area of the wide face 231c is larger than the area of the narrow face 231d. The two wide faces 231c are disposed to be opposite to each other in the axial direction X. The wide faces 231c of the electrode unit 231 face the top cover assembly 22. The wide faces 231c and the narrow faces 231d of the electrode unit 231 are alternately disposed. The positive sub-tab 231b extends from the coating region of the positive electrode plate, and the negative sub-tab 231b extends from the coating region of the negative electrode plate. In the electrolyte infiltration step of the production process or later use of the secondary battery 20, the active material layer included in the electrode unit 231 according to the present embodiment may expand, which causes the electrode unit 231 as a whole to expand. Alternatively, the electrode unit 231 of the embodiment has a capacity of 5 Ah to 500 Ah.

The electrode assembly 23 according to the present embodiment includes two electrode units 231. Each of the two electrode unit 231 has sub-end faces 231a and sub-tabs 231b extending from the sub-end faces 231a. In the first direction Y, the two sub-end faces 231a on the same side form one end face 23a of the electrode assembly 23. The two sub-tabs 231b having same electrode converge to form the tab 23b of the electrode assembly 23. In one embodiment, the sub-tab 231b of one electrode unit 231 extends in the axial direction X from the region of the sub-end face 231a adjacent to the other electrode unit 231, so that the respective sub-tabs 231b of the two electrode units 231 are close to each other and extend a short distance to converge into the tab 23b fixedly connected to the current collecting member 24. In this way, on the one hand, the sub-tab 231b does not suffer from length redundancy (such redundancy causes the sub-tab 231b be easily inserted inside the electrode assembly 23 when bent to result in short-circuit); on the other hand, the extending dimension of the sub-tab 231b is controlled within a small range, which is advantageous to improve the overall compactness of the tab 23b formed by the convergence of the respective sub-tabs 231b, to reduce the overall space occupancy of the tab 23b, and to improve the energy density of the secondary battery 20.

The two or more electrode units 231 according to the present embodiment are laminated within the casing 21 in the axial direction X. When the electrode units 231 expand, the electrode assembly 23 generates a first expansion force along a second direction Z perpendicular to both the axial direction X and the first direction Y and a second expansion force along the axial direction X. Since the two or more electrode unit 231 are laminated and the area of the wide face 231c is larger than the area of the narrow face 231d, the first expansion force is smaller than the second expansion force. Therefore, expansion of the electrode assembly 23 mainly occurs along the axial direction X, so that the expansion force of the electrode assembly 23 is mainly in the axial direction X, while the first expansion force along the second direction Z is relatively small. Thereby, the casing 21 may not substantially deformed due to the small first expansion force. When the two or more secondary batteries 20 according to the present embodiment are arranged side by side in the second direction Z to form the battery module 10, since the second expansion force generated when each secondary battery 20 expands intersects with the second direction Z, that is, since the direction of the second expansion force generated by expansion of each secondary battery 20 is in the axial direction X, the second expansion force generated by each secondary battery 20 does not accumulate to form a large resultant force along the second direction Z. Thus, when the battery module 10 including two or more secondary batteries 20 according to the present embodiment is fixed in the second direction Z by using the external fixing member, the requirements for rigidity and strength of the fixing member is low, which is advantageous to reduce the volume or weight of the fixing member, further to improve the energy density and space utilization of the secondary battery 20 and the overall battery module 10, and further to improve the cycle performance of the secondary battery 20.

In the present embodiment of the disclosure, as shown in FIG. 2, in the second direction Z, the dimension L of the tab 23b is smaller than the dimension D of the end face 23a, that is, in the second direction Z, the tab 23b according to the present embodiment is narrower than the end face 23a, so that the tab 23b according to the present embodiment is a die-cut tab. Since the tab 23b according to the present embodiment is narrower than the end face 23a, the area of the end face 23a covered by the tab 23b is reduced while the area where the end face 23a is exposed to the outside is larger, so that the electrolyte can enter into the electrode unit 231 from the portion of the end face 23a other than the portion covered by the tab 23b in the electrolyte infiltration step. Since there is only a short distance from the end face 23a to the first electrode plate or the second electrode plate with the coating region, the electrolyte can enter more quickly and uniformly into the gap between the positive electrode plate with the coating region and the separator or the gap between the negative electrode plate with the coating region and the separator, which is advantageous to improve infiltration efficiency and infiltration effect. In one embodiment, in the second direction Z, the ratio of the dimension L of the tab 23b to the dimension D of the end face 23a is $1/15$ to $14/15$. When the ratio of the dimension L of the tab 23b to the dimension D of the end face 23a is less than $1/15$, the overcurrent capability of the tab 23b is weak. When the ratio of the dimension L of the tab 23b to the dimension D of the end face 23a is larger than $14/15$, the infiltration efficiency is low and the infiltration effect is poor.

Referring to FIG. 3, the top cover assembly 22 according to the present embodiment is sealingly connected to the casing 21 to close the opening. In one embodiment, the top cover assembly 22 includes a top cover plate 221 and electrode terminals 222. The top cover assembly 22 is sealingly connected to the casing 21 by the top cover plate 221. The top cover plate 221 and the electrode terminals are located on one side of the electrode assembly 23 in the axial direction X. The electrode terminals 222 are disposed on the top cover plate 221 and are electrically connected to the electrode assembly 23 through the current collecting members 24. According to this embodiment, the electrode terminal 222 and the current collecting member 24 are connected by welding. In this way, on the one hand, no additional connecting member is required to connect the electrode terminal 222 and the current collecting member 24, thereby reducing the number of the used components. On the other hand, during the welding process of the electrode terminal 222 and the current collecting member 24, the both melt and mix with each other, so that after the welding is completed, the both are structurally embedded with each other to improve the connection strength of the both, and the electrode terminal 222 and the current collecting member 24 are less likely to be separated from each other when the secondary battery 20 is subjected to external vibration, and therefore, the use safety and stability of the secondary battery 20 are improved. The electrode terminal 222 and the current collecting member 24 according to the present embodiment are welded to form a welded portion 99. Alternatively, the electrode terminal 222 and the current collecting member 24 according to the present embodiment may be connected by means of hot-melt welding.

Figure 6:
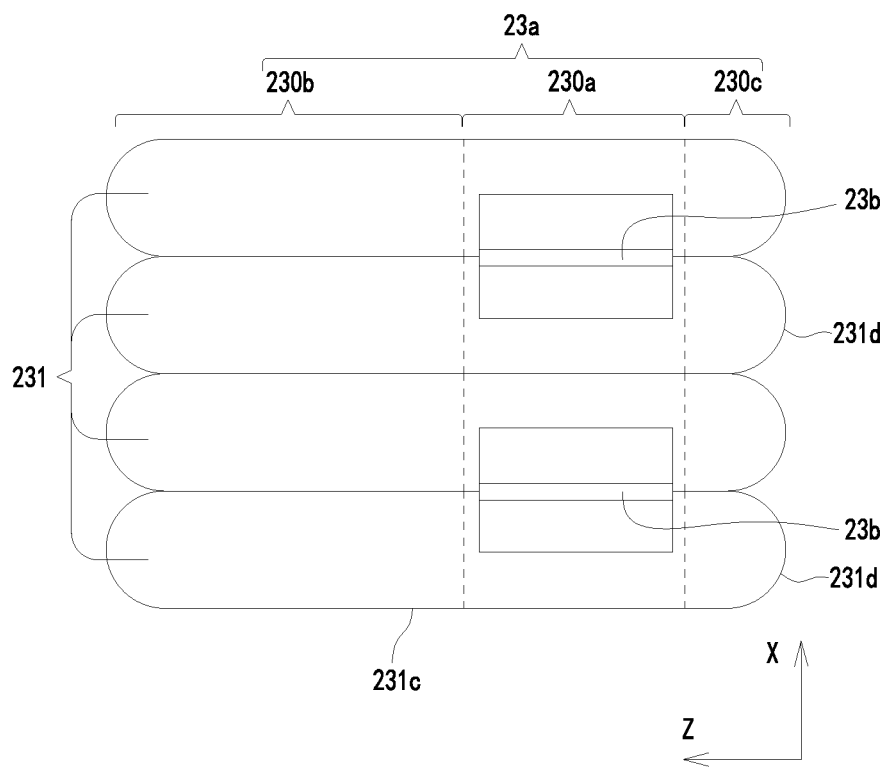
FIG. 6 is a schematic side view showing the structure of an electrode assembly according to an embodiment of the disclosure.
Figure 7:
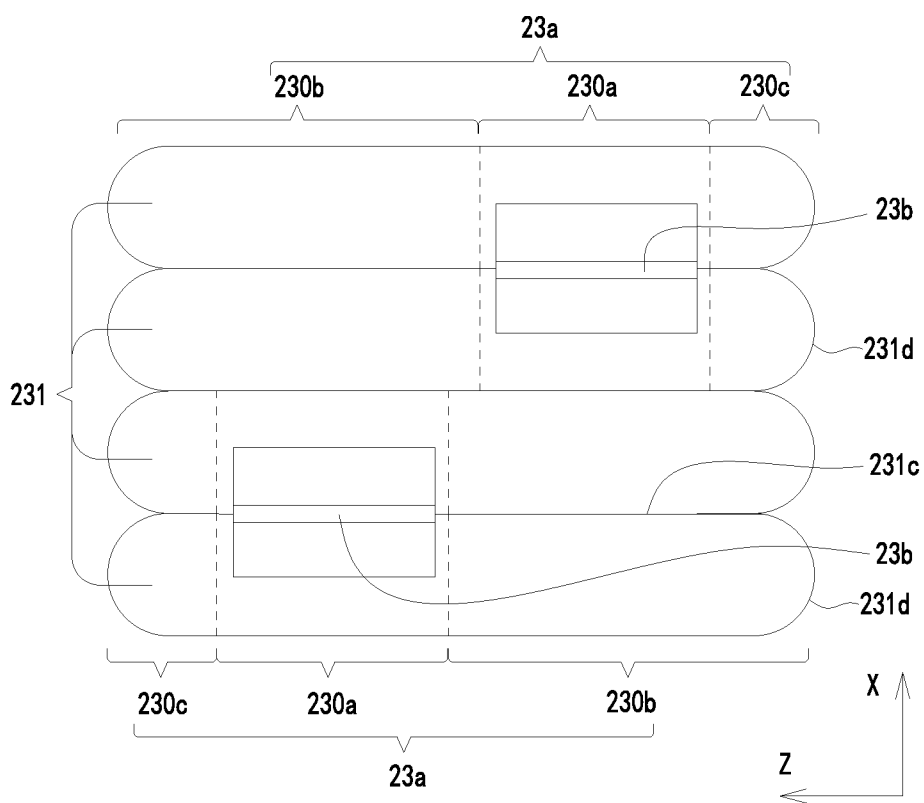
FIG. 7 is a schematic side view showing the structure of an electrode assembly according to another embodiment of the disclosure.

In one embodiment, as shown in FIGS. 6 and 7, in the second direction Z, the end face 23a includes a first region 230a, a second region 230b, and a third region 230c. The tab 23b extends only from the first region 230a. The second region 230b is located on one side of the first region 230a, and the third region 230c is located on the other side of the first region 230a, that is, the third region 230c and the second region 230b are respectively located on both sides of the first region 230a, so that the tab 23b according to the present embodiment extending from the first region 230a is formed as a die-cut tab. The tab 23b has a substantially rectangular or substantially trapezoidal cross section. Further, the dimension of the third region 230c is smaller than the dimension of the second region 230b such that the tab 23b according to the present embodiment is closer to the other narrow face 231d than one narrow face 231d. In one example, referring to FIG. 6, the number of electrode assemblies 23 is two. The two electrode assemblies 23 are laminated in the axial direction X. The first regions 230a, the second regions 230b, and the third regions 230c of the two electrode assemblies 23 are substantially aligned in the axial direction X, respectively, such that the two tabs 23b having same electrode are also substantially aligned in the axial direction X. In another example, referring to FIG. 7, the number of electrode assemblies 23 is two. The two electrode assemblies 23 are laminated in the axial direction X. One of the two electrode assemblies 23 is disposed to be rotated 180° with respect to the other of the two electrode assemblies 23 such that the first regions 230a, the second regions 230b, and third regions 230c of the two electrode assemblies 23 do not correspond in the axial direction X, respectively. The two tabs 23b having same electrode of the two electrode assemblies 23 differ in position, and the two tabs 23b having same electrode do not overlap in the axial direction X.

Referring to FIG. 3, the current collecting member 24 according to the present embodiment of the disclosure includes a connecting portion 241 located between the end face 23a and the casing 21 and a body portion 242 connected to the connecting portion 241. The connecting portion 241 and the tab 23b are at least partially overlapped in the axial direction X, thereby reducing the space occupancy of the connecting portion 241 and the tab 23b in the first direction Y, which is advantageous to improve the energy density of the secondary battery 20. The body portion 242 is at least partially located between the electrode assembly 23 and the top cover assembly 22. In one embodiment, a portion of the body portion 242 located between the electrode assembly 23 and the top cover assembly 22 is welded to the electrode terminal 222. In one embodiment, the body portion 242 includes a sheet-like body that is connected to the connecting portion 241 and bosses that protrude from the sheet-like body. The thickness direction of the sheet-like body is parallel to the axial direction X. The bosses protrude toward the electrode terminal 222 along the axial direction. The body portion 242 is welded to the electrode terminal 222 by the bosses. The top cover plate 221 is provided with an electrode lead-out hole, and the boss extends at least partially into the electrode lead-out hole to be welded to the electrode terminal 222, thereby reducing the space occupancy of the body portion 242 in the axial direction X, which is advantageous to improve the energy density of the secondary battery 20.

In one embodiment, referring to FIG. 2, the connecting portion 241 has a first sheet 241a extending along the axial direction X. The tab 23b is electrically connected to the first sheet 241a. The first sheet 241a has a stripe structure and the thickness direction of the first sheet 241a is parallel to the first direction Y, thereby reducing the dimension of the first sheet 241a in the first direction Y, which is advantageous to reduce the space occupancy of the first sheet 241a in the first direction Y and to improve the energy density of the secondary battery 20. Alternatively, the first sheet 241a has a rectangular structure. Further, the connecting portion 241 further has a current collecting piece 241b. The tab 23b is electrically connected to the first sheet 241a through the current collecting piece 241b. A portion where the current collecting piece 241b and the tab 23b are connected with each other is configured as a connection structure. The connection structure does not protrude out of the edge 221a of the top cover plate 221 in the first direction Y. In this way, on the one hand, it is possible to reduce the space occupancy of the connection structure formed by both the current collecting piece 241b and the tab 23b in the first direction Y, which is advantageous to improve the energy density of the secondary battery 20; on the other hand, in the process in which the electrode assembly 23 is fitted into the casing 21, the connection structure formed by both the current collecting piece 241b and the tab 23b does not interfere with the casing 21.

Figure 8:
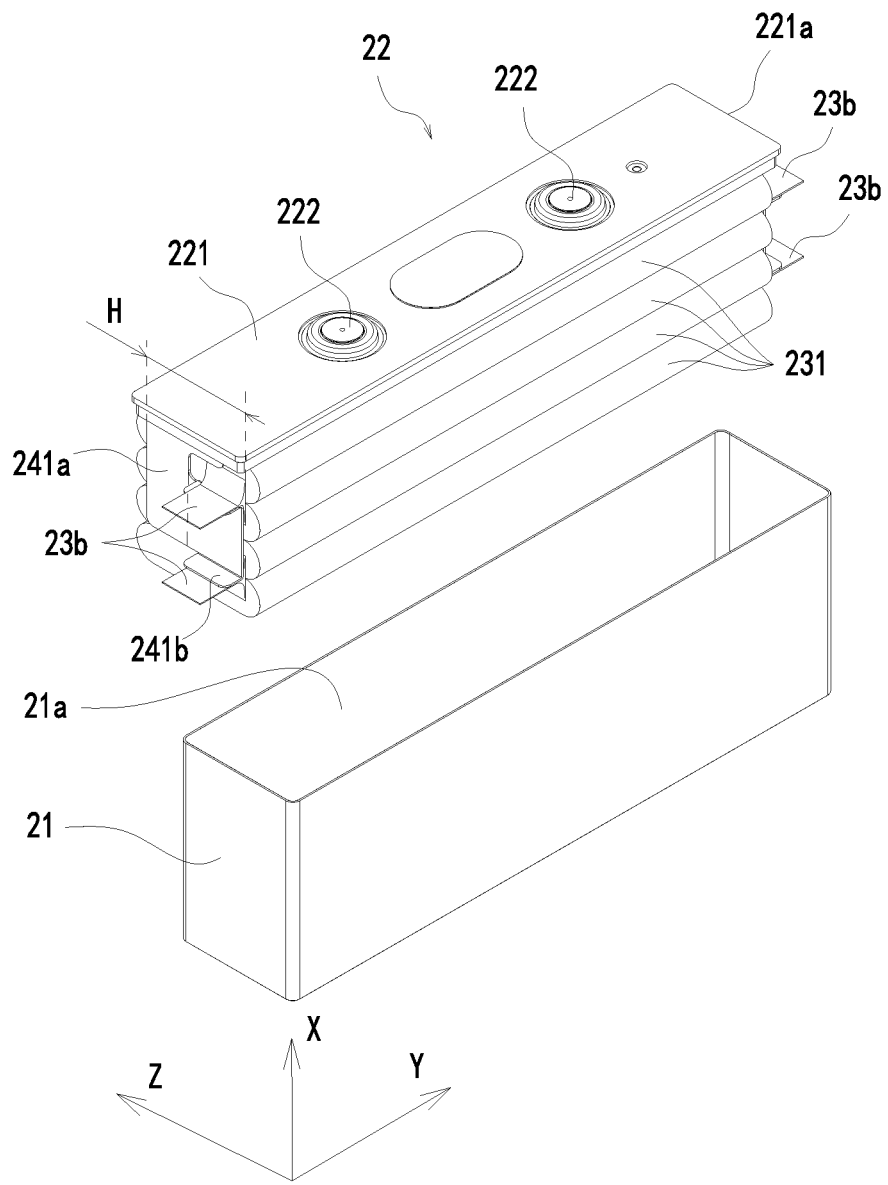
FIG. 8 is a schematic view showing a state in which the current collecting member and the electrode assembly of the secondary battery shown in FIG. 2 are connected.

In one embodiment, the tab 23b and the current collecting piece 241b are both located on one side of the first sheet 241a in the second direction Z. The current collecting piece 241b and the tab 23b are at least partially overlapped in the axial direction X. The first sheet 241a and the tab 23b are at least partially overlapped in the second direction Z. Since the dimension of the tab 23b according to the present embodiment in the second direction Z is smaller than the dimension of the end face 23a in the second direction Z, the yielding space a having larger region can be reserved in the second direction Z. Therefore, at least a portion of the first sheet 241a according to the present embodiment is disposed in the yielding space and overlaps with the tab 23b in the second direction Z, such that the first sheet 241a does not occupy excessive space formed between the end face 23a of the electrode assembly 23 and the casing 21 in the first direction Y, which is advantageous to improve the energy density of the secondary battery 20. The first sheet 241a is disposed corresponding to the second region 230b of the end face 23a. Preferably, in the present embodiment, as shown in FIG. 8, in the second direction Z, the sum H of the dimension of the first sheet 241a and the dimension of the tab 23b is smaller than the dimension D of the end face 23a (see FIG. 2). Therefore, it is possible to ensure that in the second direction Z, the portion of the current collecting member 24 located between the end face 23a and the casing 21 does not extend across the edge of the electrode unit 231, the space occupied by the current collecting member 24 in the second direction Z is lowered, and the energy density of the secondary battery 20 is effectively improved.

In one embodiment, the number of electrode assemblies 23 is two groups. The two groups of electrode assemblies 23 are laminated in the axial direction X. The number of the current collecting pieces 241b is two. The two current collecting pieces 241b are spaced apart in the axial direction X and the two current collecting pieces 241b are at least partially overlapped in the axial direction X, which is advantageous to reduce the space occupancy of the two current collecting pieces 241b in the second direction Z. The tab 23b of one group of electrode assemblies 23 and the tab 23b of the other group of electrode assemblies 23 are connected to two current collecting pieces 241b, respectively. The tab 23b of the one group of electrode assemblies 23 and the tab 23b of the other group of electrode assemblies 23 at least partially overlap in the axial direction X. Preferably, the two tabs 23b are aligned in the axial direction X, and the two current collecting pieces 241b are also aligned in the axial direction X.

In the present embodiment, the tabs 23b having same electrode of the two groups of electrode assemblies 23 are connected by using two current collecting pieces 241b to achieve current collection. In this way, on the one hand, it is possible to avoid the case where the temperature of the connection region between the tab 23b and the current collecting piece 241b is too high when a plurality of electrode units 231 are connected to the current collecting piece 241b through one tab 23b, and also to avoid the occurrence of pseudo soldering between the tab 23b and the current collecting piece 241b. On the other hand, only a shorter dimension is required for the tab 23b to be extended to be connected fixedly to the corresponding current collecting piece 241b, and accordingly it is not necessary for the tab 23b to be extended beyond the end face 23a to be too long and then to be connected to the current collecting piece 241b, thereby ensuring uniform processing dimension and uniform processing steps of the electrode unit 231, and reducing processing difficulty and processing cost. In one embodiment, the two groups of electrode assemblies 23 are laminated in the axial direction X. Each group of electrode assemblies 23 includes two electrode units 231. The electrode unit 231 has sub-end faces 231a and sub-tabs 231b extending from the sub-end faces 231a. In the first direction Y, the two sub-end faces 231a on the same side form the end face 23a of one electrode assembly 23, and the two sub-tabs 231b having same electrode converges to form the tab 23b of one electrode assembly 23. Further, the sub-tabs 231b of one electrode unit 231 extend in the axial direction X from the region of the sub-end faces 231a adjacent to the other electrode unit 231, so that the respective sub-tabs 231b of the two electrode units 231 are close to each other and extend a short distance to converge into the tab 23b fixedly connected to the current collecting member 24. In this way, on the one hand, the sub-tab 231b does not suffer from length redundancy caused by its excessive extending length, thereby reducing the possibility of occurrence of breakage of the sub-tab 231b caused by stress concentration generated when the sub-tab 231b is bent in the case where length redundancy occurs. On the other hand, the extending dimension of the sub-tab 231b is controlled within a small range, which is advantageous to reduce the space occupancy of the tab 23b formed by the convergence of the respective sub-tabs 231b and to improve the energy density of the secondary battery 20.

In one embodiment, referring to FIG. 8, the thickness direction of the current collecting piece 241b is parallel to the axial direction X. The current collecting piece 241b has a predetermined length and width, wherein the length direction is parallel to the second direction Z, and the width direction is parallel to the first direction Y. The surface of the current collecting piece 241b for connection with the tab 23b and the surface of the tab 23b for connection with the current collecting piece 241b are substantially in the same horizontal plane, so that the tab 23b is directly connected to the surface of the current collecting piece 241b after the tab 23b protrudes directly out of the end face 23a of the electrode assembly 23. In this way, it is not necessary to bend the tab 23b to connect the bended free end to the current collecting piece 241b, thereby avoid the occurrence of crack or breakage of the tab 23b caused by excessive tensile stress due to bending, reducing the probability of the failure of the electrode assembly 23 due to damage of the tab 23b, improving the yield of the secondary battery 20, and effectively reducing the production cost. The tab 23b is connected to the surface of the current collecting piece 241b facing or facing away from the top cover assembly 22. In this way, the current collecting piece 241b is disposed away from the electrode assembly 23, and a sufficiently large yielding space can be reserved on opposite sides of the current collecting piece 241b in the axial direction X. This facilitates the ultrasonic device to clamp the current collecting piece 241b from the opposite sides of the current collecting piece 241b along the axial direction X when the current collecting piece 241b and the tab 23b are ultrasonically welded, thereby facilitating the ultrasonic welding operation. In one example, the connecting portion 241 includes a transition portion that is connected to the first sheet 241a. In the second direction Z, the transition portion is provided on one side of the first sheet 241a. The current collecting piece 241b is disposed on the transition portion, so that the current collecting piece 241b is connected to the first sheet 241a through the transition portion. The transition portion may have a sheet-like structure whose thickness direction is parallel to the first direction Y. The transition portion can provide stable support for the current collecting piece 241b and improve the overcurrent capability between the current collecting piece 241b and the first sheet 241a.

Figure 9:
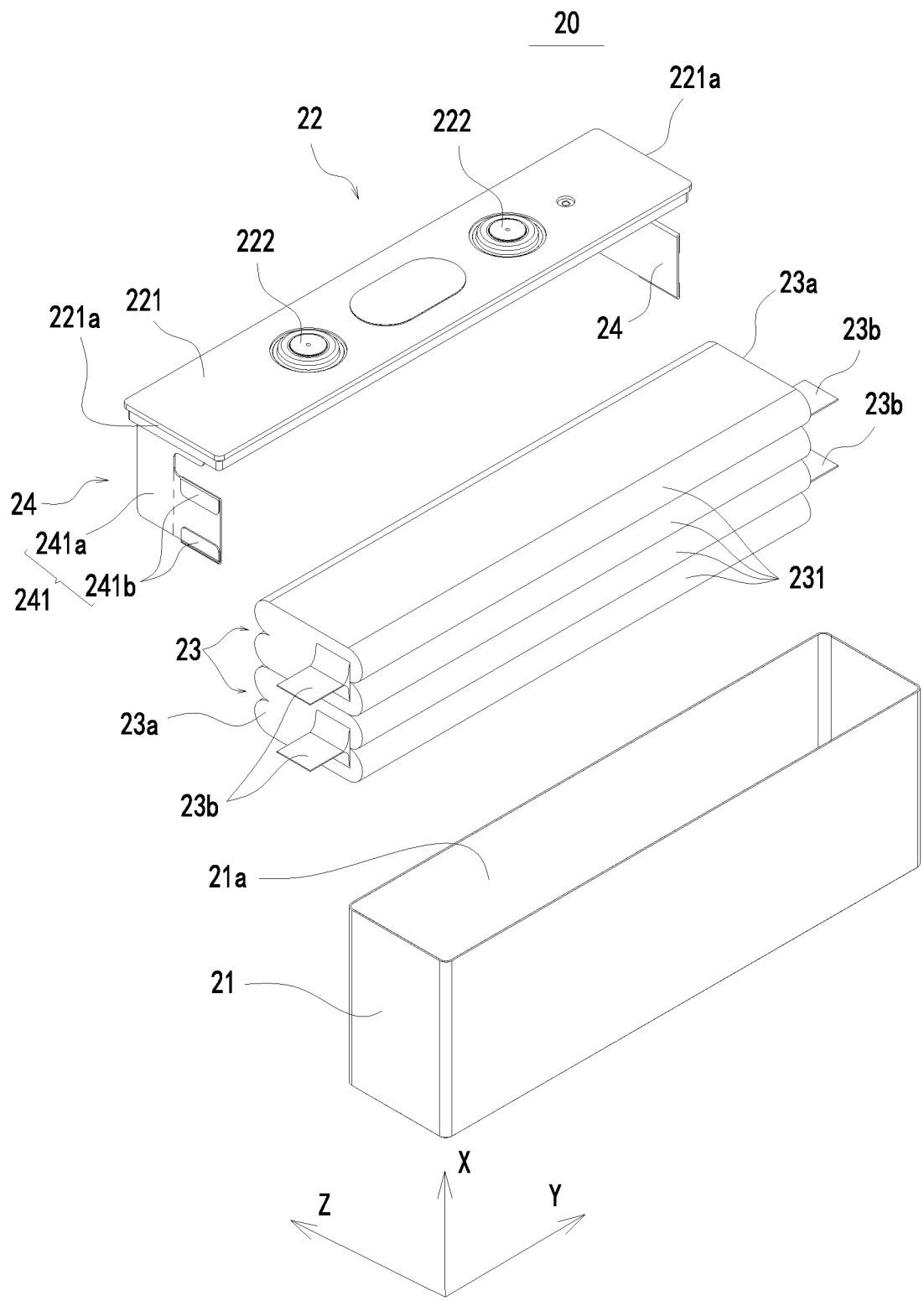
FIG. 9 is a schematic exploded perspective view of a secondary battery according to another embodiment of the disclosure.
Figure 10:
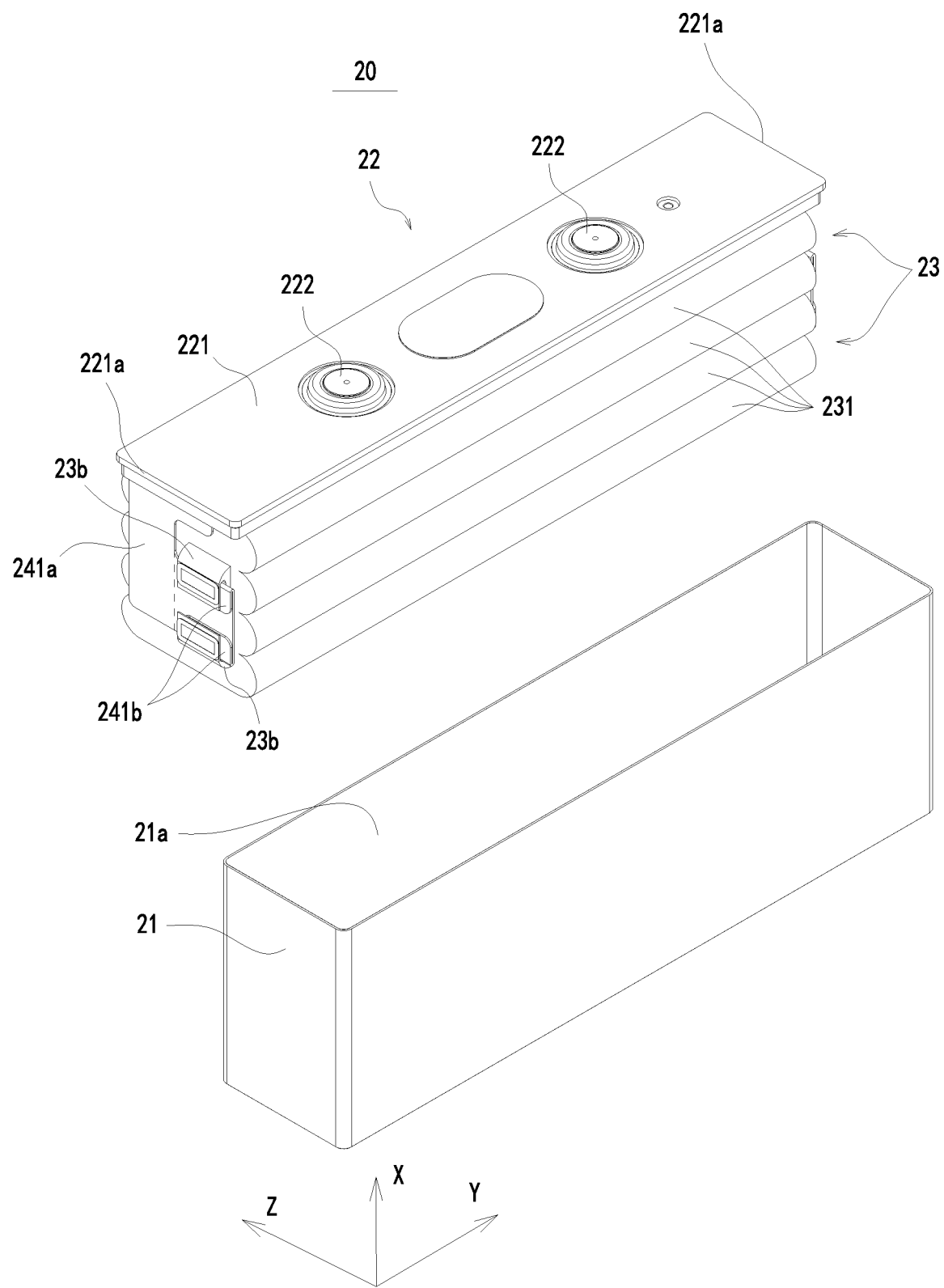
FIG. 10 is a schematic view showing a state in which the current collecting member and the electrode assembly of the secondary battery shown in FIG. 9 are connected.

In another embodiment, referring to FIGS. 9 and 10, the current collecting piece 241b is folded with respect to the first direction Y, and the thickness direction of the current collecting piece 241b is parallel to the first direction Y. In one example, the tab 23b is folded with respect to the first direction Y and is fixedly connected to the surface of the current collecting piece 241b facing away from the end face 23a. Therefore, the current collecting piece 241b forms a shield for the electrode assembly 23, so that the free end of the tab 23b will not be folded to contact the end face 23a of the electrode assembly 23 during installation or later use, thereby reducing the possibility of structural damage or breakage of the electrode unit 231 generated when the tab 23b is folded to be inserted into end face 23a. The current collecting piece 241b may be welded to the tab 23b in a state in which its thickness direction is parallel to the axial direction X, and then the current collecting piece 241b and the tab 23b may be bent with respect to the first direction Y such that the thickness direction of the current collecting piece 241b is parallel to the first direction Y. Thus, in the first direction Y, the total thickness of both the current collecting piece 241b and the tab 23b is small, thereby occupying less space formed between the electrode assembly 23 and the casing 21, and effectively improving the energy density of the secondary battery 20.

In this embodiment, the tab 23b extending from the first region 230a is the die-cut tab and has a substantially rectangular or substantially trapezoidal cross section. Therefore, compared with the die-cut tab having the arc-shaped region with the same shape as the narrow face 231d in the cross section of the tab 23b, the tab 23b according to the present embodiment has a good folding ability, and breakage or tear of the tab 23b caused by stress concentration generated due to bending of the arc-shaped region will not occur. In the electrode unit 231 having the full tab, since the width of the full tab in the second direction Z is substantially same as the width of the end face 23a in the second direction Z, and the height of the full tab in the axial direction X is substantially same as the height of the end face 23a in the axial direction X, the full tab almost covers the entire end face 23a, therefore, the electrolyte cannot easily and more uniformly pass through the full tab which is not coated with the active material to be immersed into the gap between the positive electrode plate and the negative electrode plate coated with the active material. Since the tab 23b according to the present embodiment is the die-cut tab, the tab 23b covers only a part of the end face 23a, and therefore, the electrolyte can be more quickly and uniformly immersed into the gap between the positive tab and the negative tab coated with the active material through the end face 23a, thereby improving effectively the infiltration efficiency and improving the infiltration effect.

Figure 11:
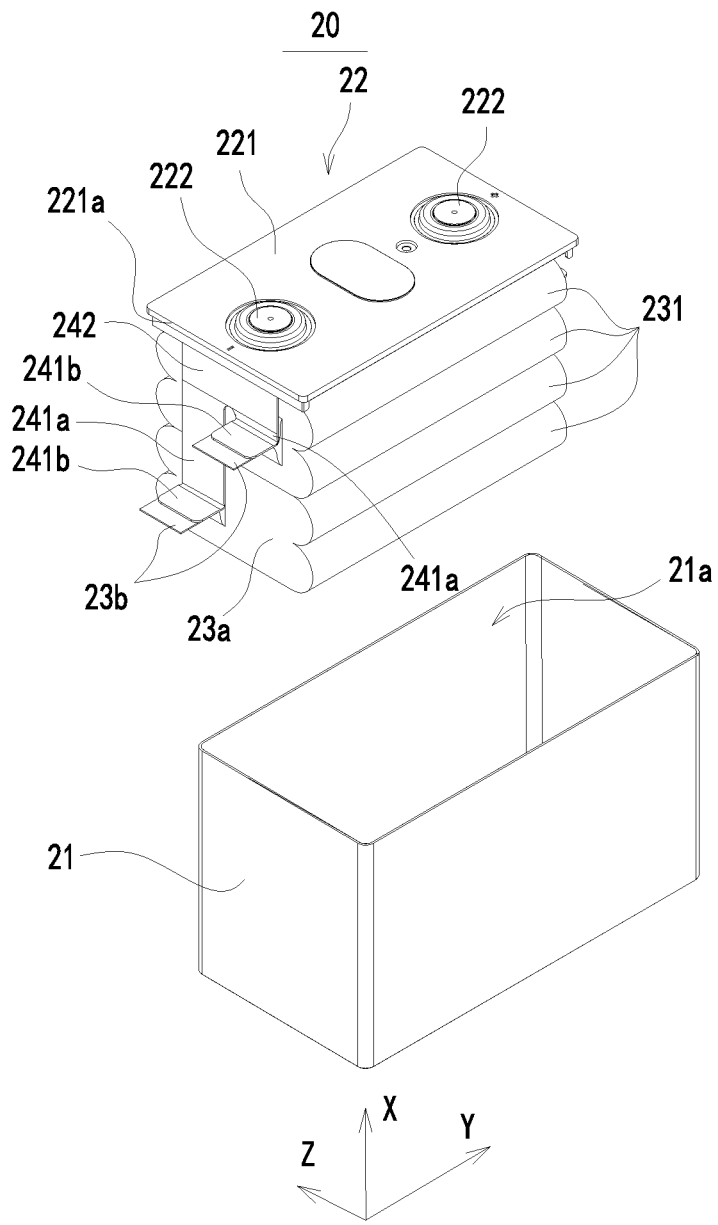
FIG. 11 is a schematic exploded perspective view of a secondary battery according to still another embodiment of the disclosure.
Figure 12:
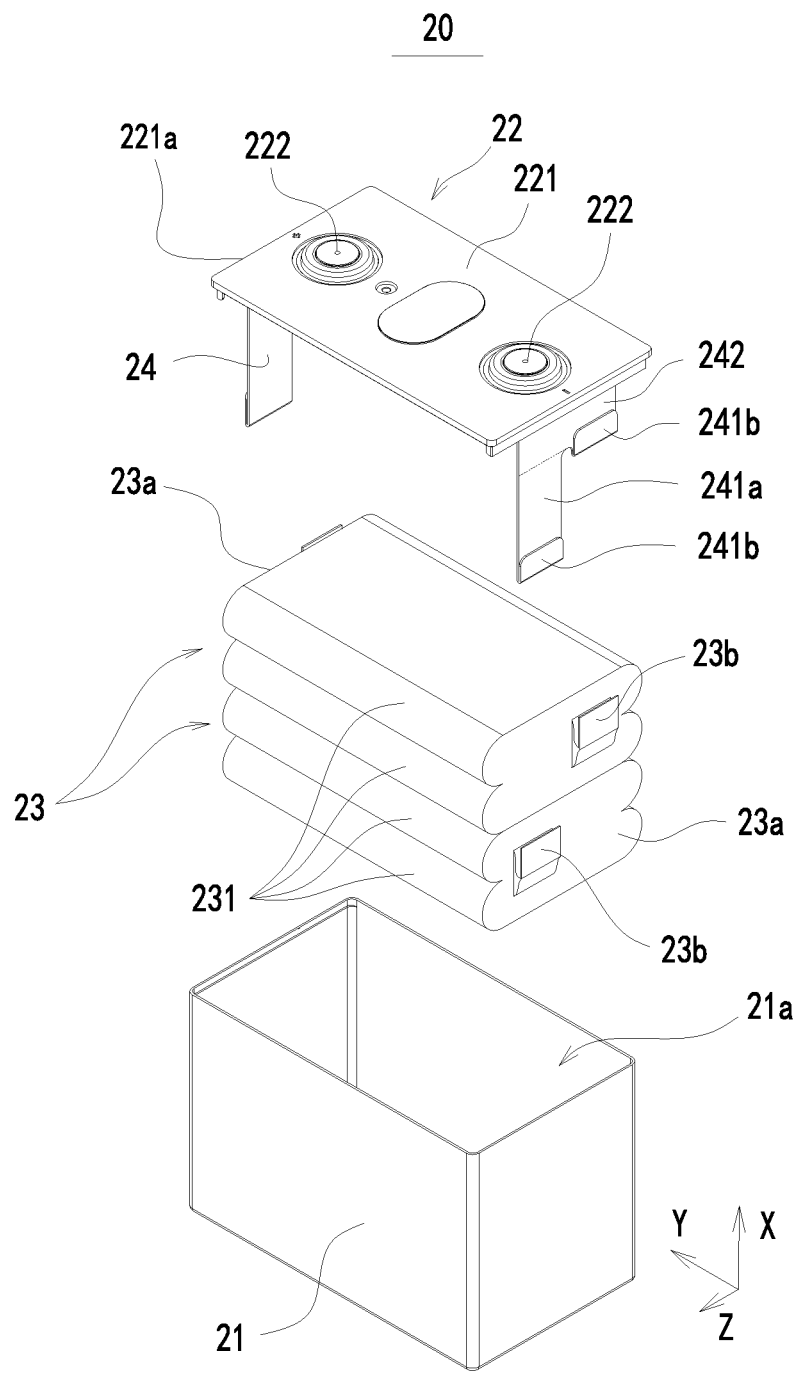
FIG. 12 is a schematic exploded perspective view of a secondary battery according to still another embodiment of the disclosure.
Figure 13:
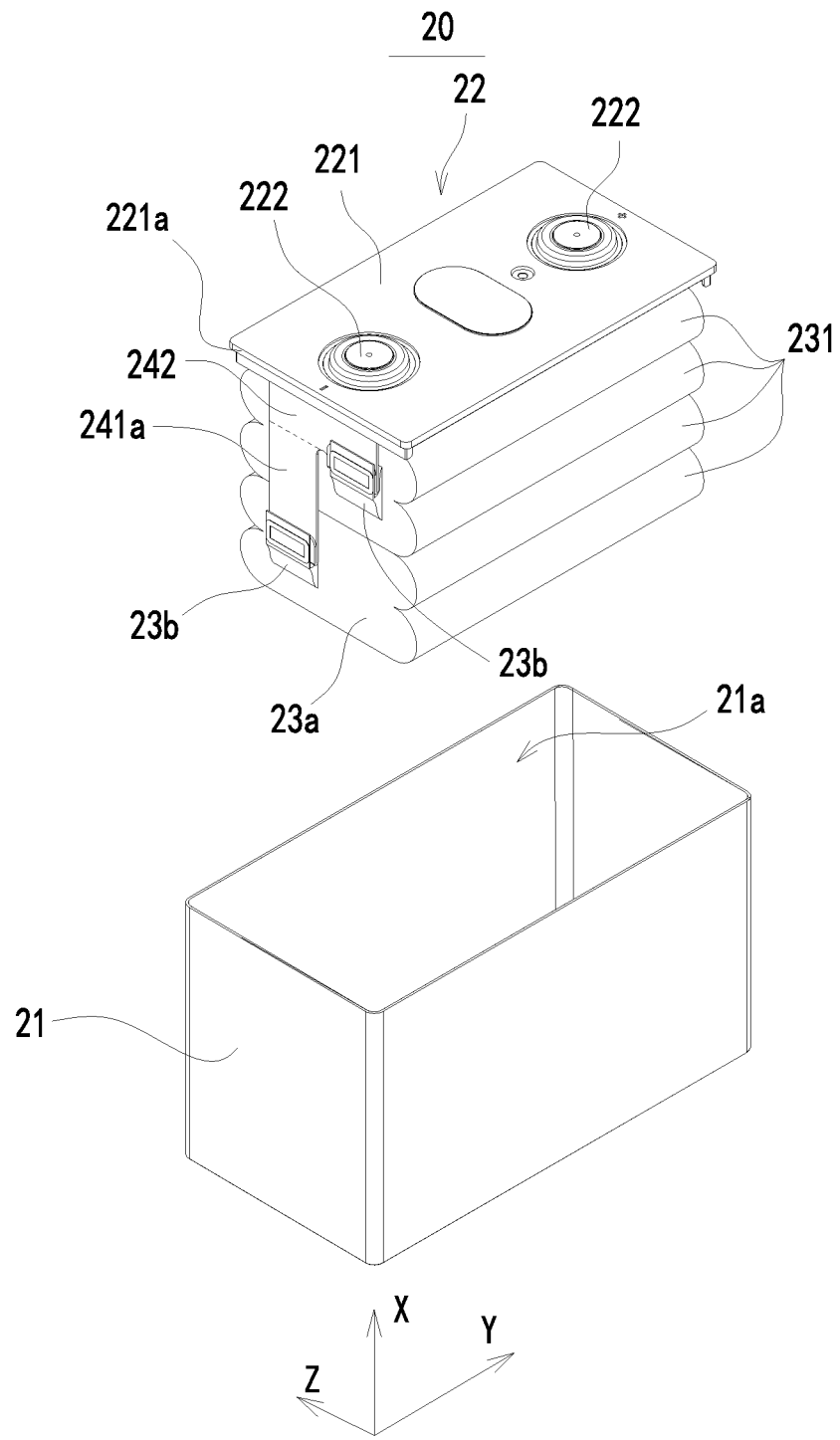
FIG. 13 is a schematic view showing a state in which the current collecting member and the electrode assembly of the secondary battery shown in FIG. 12 are connected.

In one embodiment, referring to FIGS. 11 to 13, the first sheet 241a and the tab 23b are at least partially overlapped in the axial direction X. The first sheet 241a and the tab 23b are distributed in the axial direction X. The current collecting piece 241b is connected to the end of the first sheet 241a away from the top cover assembly 22. The current collecting piece 241b connected to the first sheet 241a extends along the second direction Z and is connected to the tab 23b, so that the current collecting piece 241b does not occupy more space within the casing 21 in the axial direction X, which is advantageous to reduce the dimension of the secondary battery 20 in the axial direction X or increase the dimension of the electrode assembly 23 in the axial direction X, thereby increasing the energy density of the secondary battery 20.

In one example, the number of electrode assemblies 23 is two groups. The two groups of electrode assemblies 23 are laminated in the axial direction X. The tab 23b of one group of electrode assemblies 23 and the tab 23b of the other group of electrode assemblies 23 are spaced apart in the axial direction X and are spaced apart in the second direction Z. The number of the first sheets 241a and the number of the current collecting pieces 241b are respectively two and the first sheets 241a are disposed in one-to-one correspondence with the current collecting pieces 241b. The two first sheets 241a are spaced apart in the second direction Z. The two current collecting pieces 241b are spaced apart in the axial direction X and are spaced apart in the second direction Z. The two tabs 23b extending from the two groups of electrode assemblies 23 are also spaced apart in the axial direction X. Also, the two first sheets 241a do not overlap in the axial direction X, and the two tabs 23b do not overlap in the axial direction X. The two tabs 23b are respectively connected to the two current collecting pieces 241b. In this way, on the one hand, since the current collecting pieces 241b are disposed in one-to-one correspondence with the tabs 23b, the two current collecting pieces 241b and the two tabs 23b are offset in the axial direction X, which facilitates heat dissipation of the respective connection regions where the two current collecting pieces 241b and the two tabs 23b are connected. On the other hand, since the two first sheets 241a are spaced apart in the second direction Z and the two first sheets 241a are spaced apart in the axial direction X, when the current collecting pieces 241b are welded to the two corresponding tabs 23b, the case where the welding operation cannot be carried out or welding difficulty is increased, which is caused by positional interference between two adjacent current collecting pieces 241b or two adjacent first sheets 241a, may not occur. Alternatively, the ends of the two first sheets 241a are offset from each other in the second direction Z and do not overlap in the axial direction X, and the two ends are arranged in a stepwise manner in the axial direction X, and accordingly, the two current collecting pieces 241b and the two tabs 23b are also arranged in a stepwise manner in the axial direction X. It can be appreciated that the number of the first sheet 241a, the current collecting piece 241b, and the tab 23b is not limited to two, and may be three or more.

Alternatively, referring to FIG. 11, the current collecting piece 241b is in a non-folded state. The current collecting piece 241b is substantially perpendicular to the first sheet 241a. The thickness direction of the current collecting piece 241b is parallel to the axial direction X. The current collecting piece 241b extends from the first sheet 241a toward the casing 21. In one example, the tab 23b may be connected to the surface of the current collecting piece 241b facing away from the top cover assembly 22. The surface of the current collecting piece 241b facing away from the top cover assembly 22 and the surface of the tab 23b facing the current collecting piece 241b may be substantially in the same plane. To certain extent, the tab 23b may be connected fixedly to the connecting surface of the current collecting piece 241b without bending, which reduces the possibility of the breakage or tear of the tab 23b caused by its own bending. Meanwhile, since there is a larger space on opposite sides of the current collecting pieces 241b in the axial direction X, it facilitates using an ultrasonic welding apparatus to clamp the current collecting piece 241b from the opposite sides of the current collecting piece 241b and weld the tab 23b to the current collecting piece 241b, thereby effectively reducing operation difficulty in the welding connection process.

Alternatively, referring to FIGS. 12 and 13, the current collecting piece 241b is in a folded state. The thickness direction of the current collecting piece 241b is parallel to the first direction Y. The current collecting piece 241b is folded with respect to the first direction Y such that the connecting surface faces the casing 21 or the electrode assembly 23. After the current collecting piece 241b is connected fixedly to the tab 23b, the current collecting piece 241b and the tab 23b are folded, thereby reducing the total thickness of the current collecting piece 241b and the tab 23b in the first direction Y, which is advantageous to reduce the space occupancy of both the current collecting piece 241b and the tab 23b and improve the energy density of the secondary battery 20. Preferably, the connecting face of the current collecting piece 241b faces the casing 21. The end of the tab 23b connected to the connecting surface of the current collecting piece 241b does not come into contact with the electrode assembly 23 by the isolation of the current collecting piece 241b and the first sheet 241a, thereby reducing the possibility that the electrode assembly 23 is scratched or punctured by the folding of the tab 23b.

Figure 14:
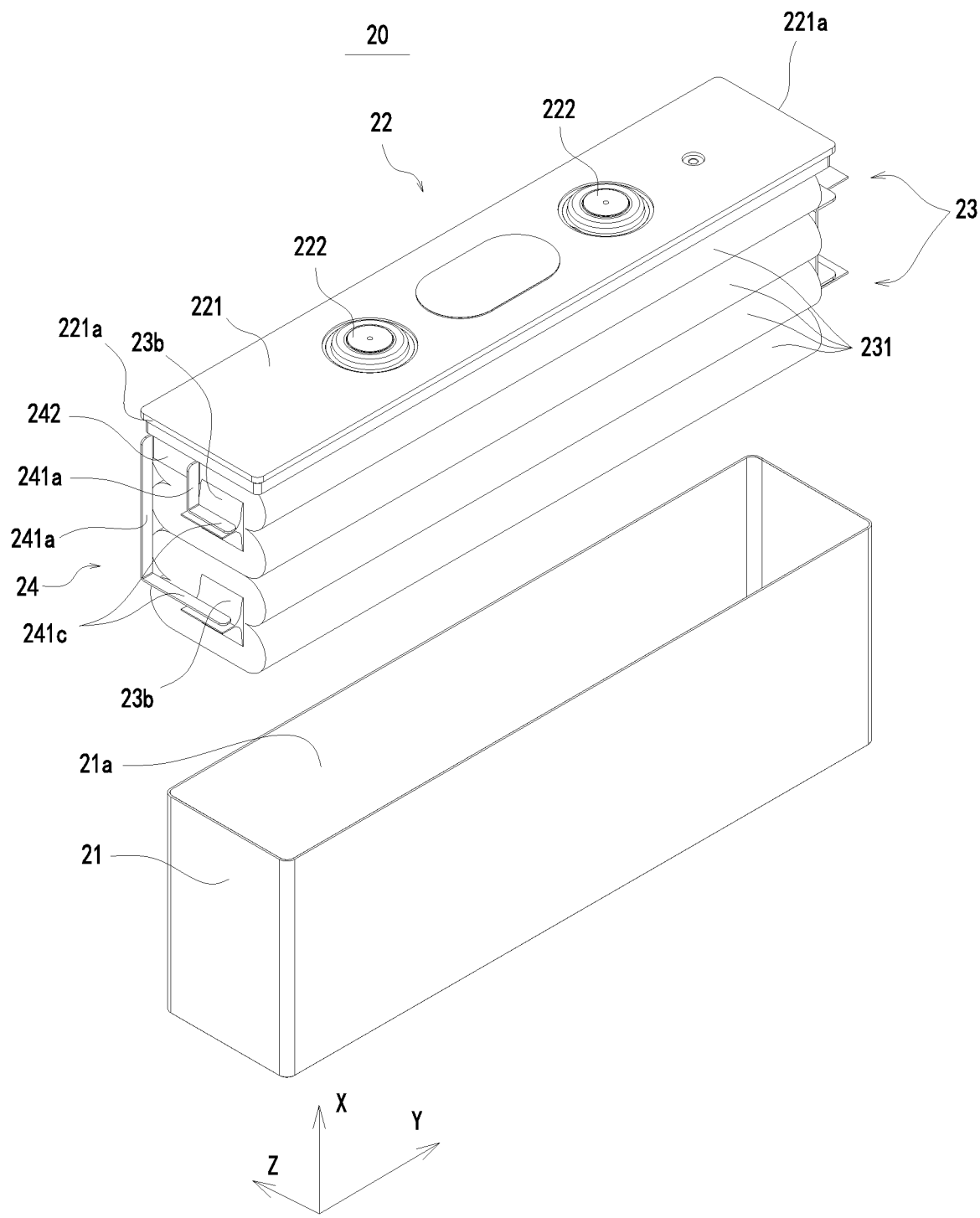
FIG. 14 is a schematic exploded perspective view of a secondary battery according to still another embodiment of the disclosure.
Figure 15:
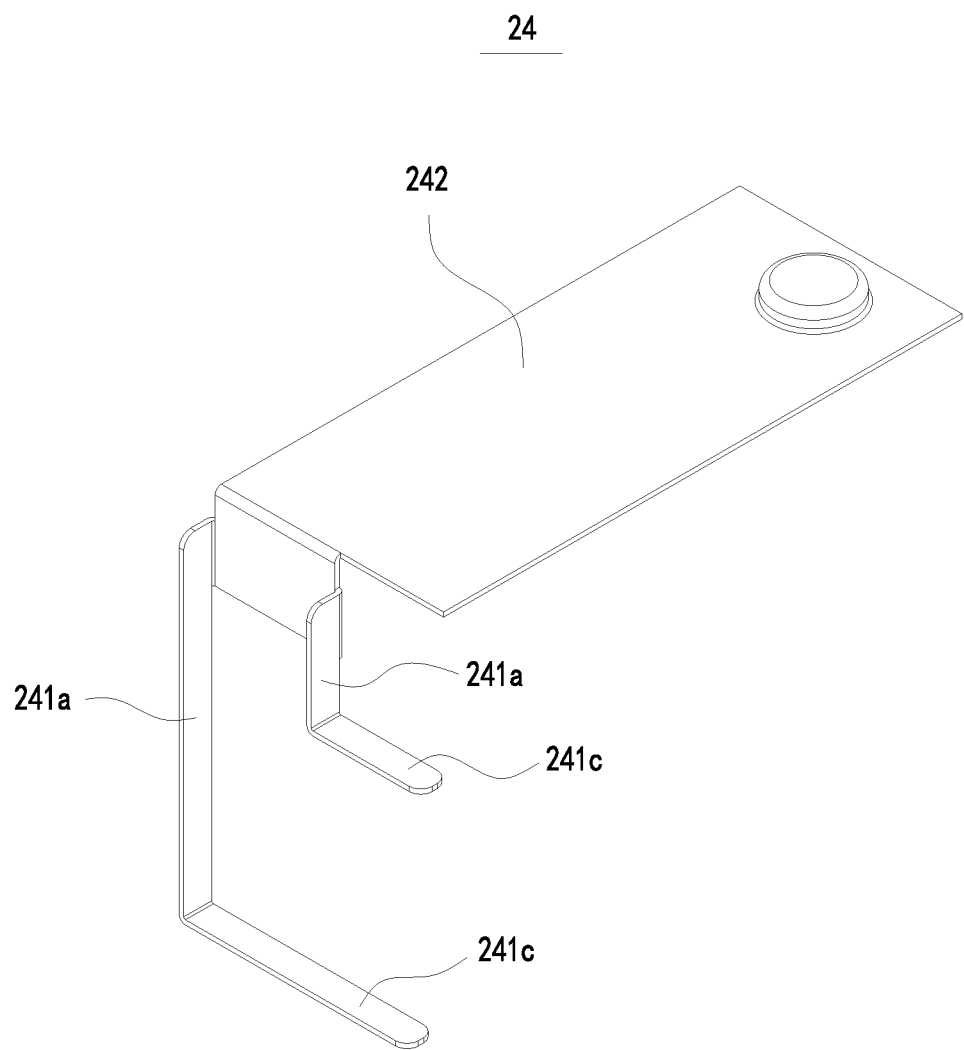
FIG. 15 is a schematic view showing the structure of the current collecting member of FIG. 14.

In one embodiment, as shown in FIGS. 14 and 15, the connecting portion 241 has a first sheet 241a extending along the axial direction X and a second sheet 241c connected to the first sheet 241a. The first sheet 241a is connected to the body portion 242, and the first sheet 241a is disposed to intersect with the body portion 242. The first sheet 241a has a stripe structure and the thickness direction of the first sheet 241a is parallel to the second direction Z. The second sheet 241c is connected to the first sheet 241a and extends toward the outside of the first sheet 241a in the second direction Z. The first sheet 241a is disposed to intersect with the second sheet 241c such that the connecting portion 241 has a substantially L-shaped cross section. The tab 23b can be connected to the surface of the second sheet 241c facing or facing away from the top cover assembly 22. The tab 23b and the second sheet 241c are at least partially overlapped in the axial direction X. In the second direction Z, the first sheet 241a is located on one side of the tab 23b, so that the first sheet 241a may not protrude out of the tab 23b in the first direction Y, which is advantageous to reduce the space occupancy of the first sheet 241a and improve the energy density of the secondary battery 20. In the axial direction X, the second sheet 241c overlaps with the tab 23b, so that the second sheet 241c may also protrude out of the tab 23b in the first direction Y, which is further advantageous to reduce the space occupancy of the first sheet 241a and improve the energy density of the secondary battery 20. In one embodiment, the thickness direction of the second sheet 241c is the same as the axial direction X. The second sheet 241c is disposed away from the electrode assembly 23, and a sufficiently large yielding space can be reserved on opposite sides of the second sheet 241c in the axial direction X. This facilitates the ultrasonic device to clamp the current collecting piece 241b from the opposite sides of the current collecting piece 241b in the axial direction X when the current collecting piece 241b and the tab 23b are ultrasonically welded, thereby facilitating the ultrasonic welding operation. In one example, in the second direction Z, the second sheet 241c and the tab 23b connected to the first sheet 241a are both located on one side of the first sheet 241a. In one example, the number of the first sheets 241a is two. The number of the second sheets 241c is also two. The two first sheets 241a are spaced apart in the second direction Z, and the dimensions of the two first sheets 241a in the axial direction X are not equal. The respective ends of the two first sheets 241a are arranged to be spaced apart in a stepwise manner in the axial direction X. The second sheets 241c are spaced apart in the axial direction X, and the dimensions of the two second sheets 241c in the second direction Z are not equal. The number of electrode assemblies 23 is two groups. The tab 23b of one group of electrode assemblies 23 is connected to the surface of the second sheet 241c in the two second sheets 241c adjacent to the top cover assembly 22 that faces or faces away from the top cover assembly 22, and the tab of the other group of electrode assemblies 23 is connected to the surface of the second sheet 241c in the two second sheets 241c away from the top cover assembly 22 that faces or faces away from the top cover assembly 22.

In one embodiment, the number of current collecting members 24 is two. The two current collecting members 24 are spaced apart in the first direction Y. In the first direction Y, the electrode assembly 23 is disposed between the two current collecting members 24. The two current collecting members 24 are electrically connected to the respective tabs 23b. Correspondingly, the two electrode terminals 222 are disposed on the top cover plate 221, and the two current collecting members 24 are respectively welded to the two electrode terminals 222.

In one embodiment, as shown in FIG. 3, in the first direction Y, a gap is reserved between the current collecting member 24 and the end face 23a of the electrode assembly 23. In this way, on the one hand, the gap can serve as a safety gap between the current collecting member 24 and the electrode assembly 23. Since the current collecting member 24 is electrically connected to the positive tab or the negative tab which is drawn out from the electrode assembly 23, after the gap is reserved, the current collecting member 24 does not come into contact with the negative tab or the positive tab of the electrode unit 231, thereby avoiding occurrence of short-circuit generated when the current collecting member 24 connected to the positive tab of the electrode assembly 23 is electrically connected to the negative electrode plate of the electrode unit 231 or when the current collecting member 24 connected to the negative tab of the electrode assembly 23 is electrically connected to the positive electrode plate of the electrode unit 231, and improving the use safety of the secondary battery 20. On the other hand, in the embodiment where the current collecting member 24 includes the current collecting piece 241b which is in the folded state, this gap can be used to provide the space for the supporting member. After the support member is inserted into the gap, a folding operation is performed to the current collecting piece 241b by applying an external force using an auxiliary tool, so that the supporting member can prevent the current collecting piece 241b from being inserted into the electrode unit 231 under the external force, thereby preventing the current collecting piece 241b from being inserted into the electrode unit 231 during folding to damage to the structure of the electrode unit 231. Alternatively, in the first direction Y, the gap has a dimension from 1.5 mm to 2 mm.

The battery module 10 according to the present embodiment of the disclosure includes a plurality of secondary batteries 20 which are arranged side by side in a direction intersecting the axial direction X. In the present embodiment, the plurality of secondary batteries 20 may be arranged side by side in the first direction Y or the second direction Z. The electrode units 231 included in the respective secondary batteries 20 according to the present embodiment are laminated in the axial direction X of the receiving hole 21a of the casing 21. Therefore, when the electrode units 231 according to the present embodiment expand, expansion or deformation mainly occurs in the axial direction X of the receiving hole 21a, and the expansion amount in the direction in which the secondary batteries 20 are arranged is small. Thus, the sum of the expansion forces accumulated in the direction in which the secondary batteries 20 are arranged is small. In the direction in which the secondary batteries 20 are arranged, a structural member with higher strength is not required for the battery module 10 to restrain or counteract the expansion force; or only a structural member with lower strength may be required to restrain or counteract the expansion force, thereby effectively reducing the overall quality of the battery module 10, making the battery module 10 itself more compact, and effectively increasing the energy density of the battery module 10. At the same time, the battery module 10 has a small expansion amount in the thickness direction of the secondary batteries 20, which can effectively improve the safety during the use.

Although the disclosure has been described with reference to the above preferred embodiments, various modifications may be made thereto and the components therein may be replaced with equivalents without departing from the scope of the disclosure. In particular, each technical feature mentioned in the various embodiments may be combined in any manner as long as there is no structural conflict. The disclosure is not limited to the specific embodiments disclosed herein, but includes all technical solutions falling within the scope of the claims.

What is claimed is:

1. A secondary battery, comprising:
    a casing, which includes a receiving hole having an opening;
    a top cover assembly, which includes a top cover plate connected to the casing to close the opening;
    an electrode assembly, which is disposed within the receiving hole, the electrode assembly includes two end faces which are opposed to each other in a first direction perpendicular to an axial direction of the receiving hole and tabs extending from the end faces, the electrode assembly further includes two or more electrode units which are laminated in the axial direction, and a dimension of the tab is smaller than a dimension of the end face in a second direction perpendicular to the axial direction and the first direction; and
    a current collecting member, which is electrically connected to the tab,
    wherein the current collecting member includes a connecting portion disposed between the end face and the casing, the connecting portion has a first sheet extending along the axial direction and a current collecting piece through which the tab is electrically connected to the first sheet,
    wherein the current collecting piece is located on one side of the first sheet in the second direction and extends from the first sheet toward the casing perpendicular to the first sheet;
    wherein the current collecting piece and the tab are at least partially overlapped in the axial direction, and the first sheet and the tab are at least partially overlapped in the second direction; and
    wherein the current collecting piece and the tab are folded with respect to the first direction, respectively, such that the tab is connected to a surface of the current collecting piece facing away from the end face.

2. The secondary battery according to claim 1, wherein the number of the current collecting member is two, and in the first direction, the electrode assembly is disposed between the two current collecting members, and the two current collecting members are electrically connected to the corresponding tabs.

3. The secondary battery according to claim 1, wherein the number of the electrode assemblies is two groups, and the two groups of the electrode assemblies are laminated in the axial direction; the number of the current collecting pieces is two, and the two current collecting pieces are spaced apart in the axial direction and the two current collecting pieces are at least partially overlapped in the axial direction; the tab of one group of the electrode assemblies and the tab of the other group of the electrode assemblies are respectively connected to the two current collecting pieces, and the tab of the one group of the electrode assemblies and the tab of the other group of the electrode assemblies are at least partially overlapped in the axial direction.

4. The secondary battery according to claim 1, wherein the number of the electrode assemblies is two groups, and the two groups of the electrode assemblies are laminated in the axial direction; the number of the first sheets and the number of the current collecting pieces is respectively two, the first sheets are disposed in one-to-one correspondence with the current collecting pieces, the two first sheets are spaced apart in the second direction, and the two current collecting pieces are spaced apart in the axial direction and are spaced apart in the second direction; the tab of one group of the electrode assemblies and the tab of the other group of the electrode assemblies are spaced apart in the axial direction and are spaced apart in the second direction, and the two tabs are respectively connected to the two current collecting pieces.

5. The secondary battery according to claim 1, wherein the electrode assembly only includes the two electrode units, each of the two electrode units has two sub-end faces and a sub-tab extending from each of the two sub-end faces, two of the sub-end faces on the same side of the two electrode units of the electrode assembly form the end face, and two of the sub-tabs of the two electrode units of the electrode assembly having same electrode are converged to form the tab, and in the electrode assembly, the sub-tab of one of the two electrode units extends along the axial direction from a region of the sub-end face adjacent to the other of the two electrode units.

6. The secondary battery according to claim 5, wherein the electrode unit has two first faces and two second faces connecting the two first faces, each of the two first faces has an area greater than an area of each of the two second faces, the two first faces are opposite in the axial direction, the first faces and the second faces are alternately disposed, and the tab extends from a region of the end face adjacent to the two adjacent first faces of the two electrode units.

7. The secondary battery according to claim 5, wherein the connecting portion and the tab are at least partially overlapped in the axial direction.

8. The secondary battery according to claim 1, wherein the connecting portion and the tab are at least partially overlapped in the axial direction.

9. The secondary battery according to claim 8, wherein the current collecting member further includes a body portion that is connected to the connecting portion, and the body portion is at least partially disposed between the electrode assembly and the top cover assembly.

10. The secondary battery according to claim 8, wherein the first sheet has a stripe structure and a thickness direction of the first sheet is parallel to the first direction.

11. The secondary battery according to claim 10, wherein a connection structure is formed by the first sheet and the tab, and the connection structure does not protrude out of an edge of the top cover plate in the first direction.

12. The secondary battery according to claim 1, wherein the end face includes a first region, a second region, and a third region that are distributed along the second direction, the tab only extends out of the first region, and the second region and the third region are respectively located on both sides of the first region.

13. The secondary battery according to claim 12, wherein in the second direction, a ratio of the dimension of the tab to the dimension of the end face is 1/15 to 14/15.

14. The secondary battery according to claim 12, wherein in the second direction, a dimension of the third region is smaller than a dimension of the second region.

15. The secondary battery according to claim 14, wherein the electrode assembly only includes the two electrode units, each of the two electrode units has two sub-end faces and a sub-tab extending from each of the two sub-end faces, two of the sub-end faces on the same side of the two electrode units of the electrode assembly form the end face, and two of the sub-tabs of the two electrode units of the electrode assembly having same electrode are converged to form the tab, and in the electrode assembly, the sub-tab of one of the two electrode units extends along the axial direction from a region of the sub-end face adjacent to the other of the two electrode units.

16. The secondary battery according to claim 14, wherein the connecting portion and the tab are at least partially overlapped in the axial direction.

17. A battery module, comprising two or more secondary batteries according to claim 1, wherein the two or more secondary batteries are arranged side by side in a direction intersecting the axial direction.

* * * * *